Aug. 4, 1931.　　　　H. V. HAIGHT　　　　1,817,188
BOLT AND LOCKING SLEEVE
Filed April 4, 1928

INVENTOR.
Harry V. Haight
BY
HIS ATTORNEY

Patented Aug. 4, 1931

1,817,188

UNITED STATES PATENT OFFICE

HARRY V. HAIGHT, OF SHERBROOKE, QUEBEC, CANADA, ASSIGNOR TO INGERSOLL-RAND COMPANY, OF JERSEY CITY, NEW JERSEY, A CORPORATION OF NEW JERSEY

BOLT AND LOCKING SLEEVE

Application filed April 4, 1928. Serial No. 267,239.

This invention relates to rock drills, but more particularly to a support for the front end of a feed screw used for actuating a rock drill longitudinally of the shell whereby the rock drill is supported.

The objects of the invention are to maintain the support in axial alignment with the feed screw and to form a rigid connection between the support and the shell to which it is secured.

Other objects will be in part obvious and in part pointed out hereinafter.

Figure 1:
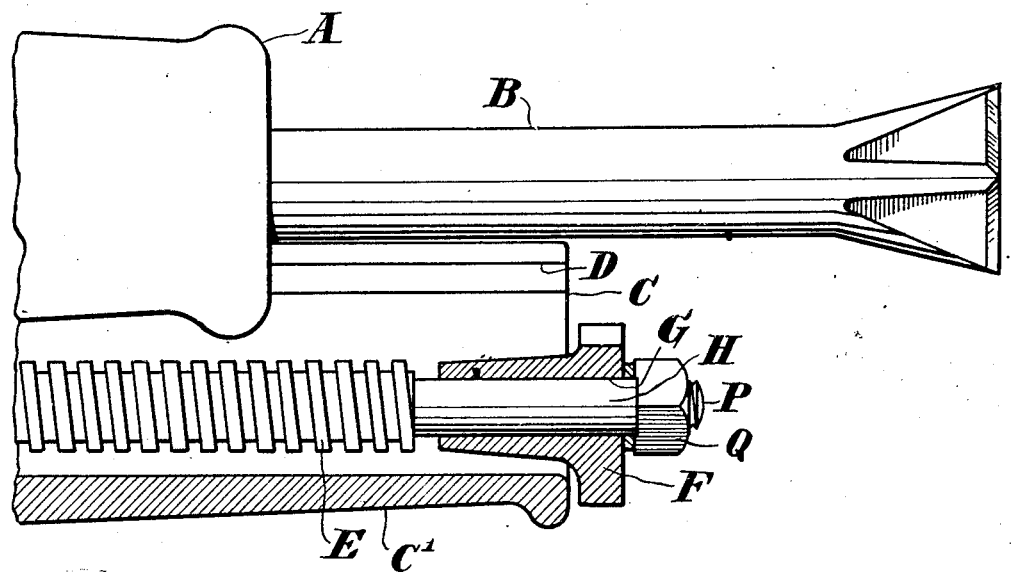
Figure 2:
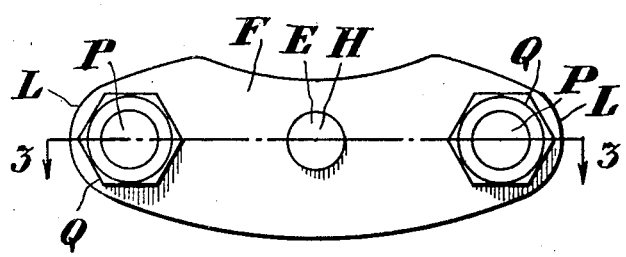
Figure 3:
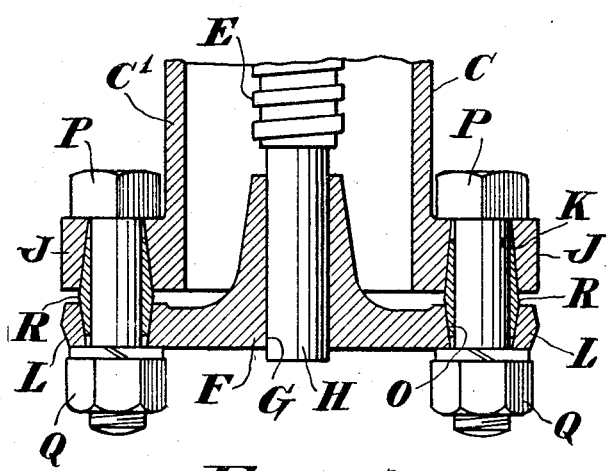

In the accompanying drawings in which similar reference characters refer to similar parts, Figure 1 is a longitudinal sectional elevation of the front end of a rock drill shell having the invention applied thereto, Figure 2 is an end view of the feed screw support, and Figure 3 is a transverse view taken through Figure 2 on the line 3—3 looking in the direction indicated by the arrows.

Referring to the drawings, A designates the front end of a rock drill front head in which is inserted a drill steel B. The rock drill indicated may be of the drifter type and is supported by a shell C in a well known manner, the rock drill being provided with the usual guides (not shown) which cooperate slidably with guideways D in the body C' of the shell C.

As is customary in apparatus of this type, the shell C is equipped with a feed screw E for actuating the rock drill longitudinally of the shell. The connection between the feed screw E and the rock drill is not shown but this may be of a well known construction as may also be the means, such as a crank handle (not shown), for rotating the feed screw.

In accordance with the practice of the invention the shell body C' is provided with a support F at the front end of said shell to support the end of the feed screw E. The support F accordingly has a bore G to rotatably receive a plain cylindrical end H of the feed screw E.

On the front end of the shell body C' are lateral lugs J in which are formed tapered apertures K. Similarly, the support F is provided with lateral lugs L which lie in the same plane as the lugs J of the shell body and are also provided with tapered apertures O.

The minimum diameters of the tapered apertures K and O are preferably somewhat larger than the diameter of bolts P inserted in the tapered apertures for clamping the support F to the shell. The bolts P are provided with nuts Q for this purpose.

As is well known devices of the type to which the present invention pertains are subjected to terrific vibration during the operation of the rock drill. Due to this condition it is difficult to maintain a rigid connection between the feed screw support, such as the support F and the shell body C', since any slight clearance in the apertures through which the bolts P extend will, after a brief period of operation, cause excessive wear on the cooperative surfaces of the bolts and the apertures through which they extend. Such wear will of course permit of some relative transverse movement between the support and the shell with the result that the feed screw E follows a gyratory movement which, when unchecked, results in serious injury and frequent breakage of the feed screw as well as such portions of the rock drill to which the feed screw may be connected.

In order to form an absolutely rigid connection which will be unaffected by the vibration of the drill, ferrules R having unbroken peripheral surfaces are disposed on the bolts P wherewith they are in body engagement, such as a slide fit. The ends of the ferrules R are suitably tapered to correspond to the tapered apertures K and O into which they extend. The ferrules are preferably of such length that their ends will lie below the surface of the plates and spaced from the bolt head and the nuts Q.

Preferably the taper on the ferrules is such that the wall of the ferrules at the ends is comparatively thin. When the nuts Q are tightened on the bolts and the support F and shell body C' are drawn together, the walls of the tapered apertures in these members will frictionally engage the tapered peripheral surface of the ferrules. The ferrules are thereby secured firmly within the apertures and the thin ends of the ferrules will be pressed into gripping relation with the bolts P. A rigid structure will be thus formed and the chances of relative transverse movement between the several elements comprising the support for the front end of the feed screw will be obviated.

I claim:

1. In a connection for rigidly securing together a pair of members, said members having apertures adapted to register one with another, a bolt extending through a pair of registering apertures in the members for drawing said members together, a tapered portion in each of said apertures disposed with the ends of greater cross sectional area at the adjacent ends of the members, a ferrule disposed about the bolt and having oppositely tapered portions adapted to be forced into frictional engagement with the walls of the tapered portions of the apertures, the walls of said ferrule at the ends being relatively thin to permit their being distorted into gripping relation with said bolt to prevent relative movement between the ferrule and the bolt.

2. In a connection for rigidly securing together a pair of members, said members having apertures adapted to register one with another, a bolt extending through a pair of registering apertures in the members and having means engaging the opposite sides of said members for drawing said members together, a tapered portion in the apertures, a ferrule disposed on the bolt with the ends of the ferrule spaced from the engaging means and having an oppositely tapered unbroken peripheral surface to correspond with the tapered apertures and with which the walls of the tapered apertures frictionally engage when pressure is applied to the engaging means to draw said members together to prevent relative movement between the members and the ferrule, said ferrule having relatively thin walls at one end adapted to be distorted into gripping relationship with the bolt to prevent relative movement between the ferrule and the bolt.

In testimony whereof I have signed this specification.

HARRY V. HAIGHT.